(12) United States Patent
Wallace et al.

(10) Patent No.: US 8,477,891 B2
(45) Date of Patent: *Jul. 2, 2013

(54) NOISE ESTIMATION FOR WIRELESS COMMUNICATION

(75) Inventors: Mark S. Wallace, San Diego, CA (US); Peter Monsen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,610

(22) Filed: Jan. 30, 2012

(65) Prior Publication Data

US 2012/0128109 A1    May 24, 2012

Related U.S. Application Data (63) Continuation of application No. 11/736,091, filed on Apr. 17, 2007, now Pat. No. 8,107,566.

(60) Provisional application No. 60/792,874, filed on Apr. 17, 2006.

(51) Int. Cl.
*H03D 1/04* (2006.01)
*H04L 27/06* (2006.01)
*H04L 7/00* (2006.01)

(52) U.S. Cl.
USPC ............................ 375/346; 375/340; 375/354

(58) Field of Classification Search
USPC ................. 375/316, 322, 324, 325, 340, 341, 375/346, 348, 350; 370/39, 67.11, 67.13, 370/130, 132, 133, 135, 226.1, 226.3, 269, 370/272, 277.1, 277.2, 296
See application file for complete search history.

(56) References Cited

U.S. PATENT DOCUMENTS 6,507,743 B1 * 1/2003 Abrishamkar et al. ....... 455/458
6,618,352 B1   9/2003 Shirakata et al.

(Continued)

FOREIGN PATENT DOCUMENTS

EP   1119145 A1   7/2001
JP   2000165341   6/2000

(Continued)

OTHER PUBLICATIONS

European Search Report—EP12180580—Search Authority—Munich—Aug. 28, 2012.

(Continued)

*Primary Examiner* — Tesfaldet Bocure
*Assistant Examiner* — Vineeta Panwalkar
(74) *Attorney, Agent, or Firm* — QUALCOMM Patent Group; James Hunt Yancey, Jr.

(57) ABSTRACT

Techniques for deriving and using noise estimate for data reception in a wireless communication system are described. A noise estimate may be derived for each packet received in a data transmission. The noise estimate may be derived by determining a phase offset between a first and second sample sequence, applying the phase offset to the first sample sequence to obtain a third sample sequence, and deriving the noise estimate based on the second and third sample sequences. Data detection may then be performed for each packet using the noise estimate for that packet. At least one weight may be derived for each packet using the noise estimate for the packet. Data detection is then performed for each packet with the at least one weight for the packet.

8 Claims, 5 Drawing Sheets

U.S. PATENT DOCUMENTS

| | | | |
|---|---|---|---|
| 7,248,627 B2 | 7/2007 | Chiu | |
| 7,352,730 B2 | 4/2008 | Ghosh et al. | |
| 7,672,383 B2 | 3/2010 | Namgoong et al. | |
| 8,107,566 B2 | 1/2012 | Wallace et al. | |
| 2002/0126741 A1 | 9/2002 | Baum et al. | |
| 2004/0120411 A1* | 6/2004 | Walton et al. | 375/260 |
| 2004/0228417 A1* | 11/2004 | Kennedy et al. | 375/260 |
| 2005/0036541 A1* | 2/2005 | McKown | 375/233 |
| 2005/0152317 A1 | 7/2005 | Awater et al. | |
| 2005/0281324 A1 | 12/2005 | Wallen | |
| 2006/0045194 A1* | 3/2006 | Athanasios et al. | 375/260 |
| 2006/0114981 A1 | 6/2006 | Ghosh et al. | |
| 2010/0281324 A1 | 11/2010 | Duan | |

FOREIGN PATENT DOCUMENTS

| | | |
|---|---|---|
| JP | 2003510883 A | 3/2003 |
| JP | 2005260337 A | 9/2005 |
| JP | 2005536103 T | 11/2005 |
| RU | 2110159 | 4/1998 |
| RU | 2235430 | 8/2004 |
| WO | 0122623 | 3/2001 |
| WO | 2004015946 A1 | 2/2004 |
| WO | 2005055456 | 6/2005 |

OTHER PUBLICATIONS

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2, Dec. 2003.

IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Society, Published by the Institute of Electrical and Electronics Engineers, Inc., Jun. 27, 2003.

IEEE Std 802.11n/D1.0; "Draft Amendment: Part 11: Wireless LAN Medium Access Control (MAC) and Physical Layer (PHY) specifications: Enhancements for Higher Throughput," Prepared by the 802.11 Working Group of the 802 Committee (2006).

International Search Report—PCT/US07/066811, International Search Authority, European Patent Office—Oct. 29, 2007.

Written Opinion—PCT/US07/066811, International Search Authority, European Patent Office—Oct. 29, 2007.

English Translation of Japanese Office Action for JPO Application No. GTB-B0012P0072, Mailed Apr. 23, 2013 (English translation provided by JPO counsel).

* cited by examiner

NOISE ESTIMATION FOR WIRELESS COMMUNICATION

CROSS-REFERENCE TO RELATED APPLICATIONS & PRIORITY CLAIM

This application is a continuation of U.S. patent application Ser. No. 11/736,091, now issued as U.S. Pat. No. 8,107,566, which claims priority to and the benefit of U.S. Provisional Application Ser. No. 60/792,874 entitled "MIMO OFDM MMSE SPATIAL RECEIVER NOISE FLOOR ESTIMATOR," filed on Apr. 17, 2006. All of said applications are hereby incorporated herein by reference as if fully set forth below in their entireties.

TECHNICAL FIELD

The present disclosure relates generally to communication, and more specifically to techniques for estimating noise at a receiver in a wireless communication system.

BACKGROUND

In a wireless communication system, a transmitter typically processes (e.g., encodes and symbol maps) traffic data to generate data symbols, which are modulation symbols for data. The transmitter then processes the data symbols to generate a modulated signal and transmits this signal via a wireless channel. The wireless channel distorts the transmitted signal with a channel response and further degrades the signal with noise and interference. A receiver receives the transmitted signal and processes the received signal to obtain data symbol estimates, which are estimates of the transmitted data symbols. The receiver then processes (e.g., demodulates and decodes) the data symbol estimates to obtain decoded data.

The received signal includes noise and interference from the wireless channel as well as noise generated at the receiver, all of which may be collectively referred to as simply "noise". The noise in the received signal degrades the quality of the data symbol estimates and affects the reliability of the decoded data. The receiver may perform detection and/or decoding in a manner to take into account the noise. A good estimate of the noise may be beneficial for detection and decoding performance.

There is therefore a need in the art for techniques to obtain a good noise estimate in a wireless communication system.

SUMMARY

Techniques for deriving and using noise estimate for data reception in a wireless communication system are described herein. In an embodiment, a noise estimate is derived for each packet received in a data transmission. The noise estimate may be derived based on multiple identical sample sequences sent with the packet or based on an automatic gain control (AGC) value for the packet. Data detection is performed for each packet using the noise estimate for that packet. In an embodiment, at least one weight is derived for each packet using the noise estimate for the packet. Data detection is then performed for each packet with the at least one weight for the packet.

In another embodiment, a noise estimate is derived based on multiple identical sample sequences sent during a transmission, e.g., a packet. A first sample sequence and a second sample sequence are obtained from each of at least one receiver used for data reception. The first and second sample sequences may correspond to, e.g., two long training symbols in a preamble of an IEEE 802.11 packet. A third sample sequence is obtained for each receiver based on the first sample sequence for the receiver. In an embodiment, a phase offset between the first and second sample sequences is determined and applied to the first sample sequence for each receiver to obtain the third sample sequence for that receiver. In another embodiment, the first sample sequence for each receiver is used as the third sample sequence for the receiver. In any case, a noise estimate is derived based on the second and third sample sequences for the at least one receiver.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The noise estimation techniques described herein may be used for various wireless communication networks such as wireless wide area networks (WWANs), wireless metropolitan area networks (WMANs), wireless local area networks (WLANs), and so on. The terms "network" and "system" are often used interchangeably. The techniques may also be used for various multiple access networks such as Frequency Division Multiple Access (FDMA), Code Division Multiple Access (CDMA), Time Division Multiple Access (TDMA), Spatial Division Multiple Access (SDMA), Orthogonal FDMA (OFDMA), and Single-Carrier FDMA (SC-FDMA) networks. An OFDMA network utilizes Orthogonal Frequency Division Multiplexing (OFDM). An SC-FDMA network utilizes Single-Carrier Frequency Division Multiplexing (SC-FDM). OFDM and SC-FDM partition the system bandwidth into multiple (K) orthogonal subcarriers, which are also called tones, bins, and so on. Each subcarrier may be modulated with data. In general, modulation symbols are sent in the frequency domain with OFDM and in the time domain with SC-FDM.

The noise estimation techniques may also be used for single-input single-output (SISO), single-input multiple-output (SIMO), multiple-input single-output (MISO), and multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception. For clarity, the techniques are described below for a WLAN that implements IEEE 802.11a, 802.11g and/or 802.11n, all of which utilize OFDM.

Figure 1:
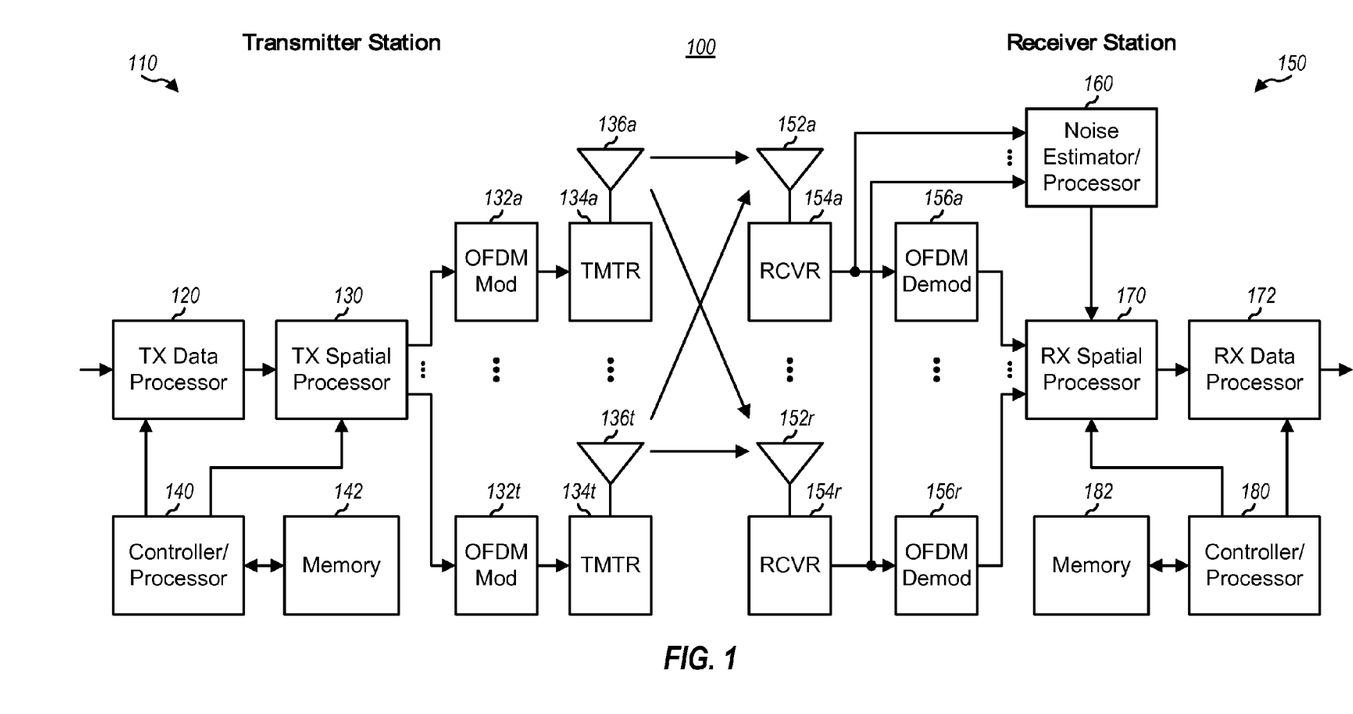
FIG. 1 shows a block diagram of a transmitter station and a receiver station.

FIG. 1 shows a block diagram of an embodiment of two stations 110 and 150 in a wireless communication network 100. For downlink (or forward link) transmission, station 110 may be part of, and may contain some or all of the functionality of, an access point, a base station, a Node B, and/or some other network entity. Station 150 may be part of, and may contain some or all of the functionality of, a terminal, a mobile station, a user equipment, a subscriber unit, and/or some other device. For uplink (or reverse link) transmission, station 110 may be part of a terminal, a mobile station, a user equipment, and so on, and station 150 may be part of an access point, a base station, a Node B, and so on. Station 110 is a transmitter of a data transmission and is equipped with multiple (T) antennas. Station 150 is a receiver of the data transmission and is equipped with multiple (R) antennas. Each transmit antenna and each receive antenna may be a physical antenna or an antenna array.

At transmitter station 110, a transmit (TX) data processor 120 processes (e.g., formats, encodes, interleaves, and symbol maps) traffic data in accordance with one or more rates and generates data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both a transmitter and a receiver.

A TX spatial processor 130 multiplexes the data symbols with pilot symbols, performs transmitter spatial processing on the multiplexed data symbols and pilot symbols, and provides T output symbol streams to T OFDM modulators (Mod) 132a through 132t. Each OFDM modulator 132 performs OFDM modulation on its output symbol stream and provides OFDM symbols to an associated transmitter (TMTR) 134. Each transmitter 134 processes (e.g., converts to analog, filters, amplifies, and upconverts) its OFDM symbols and generates a modulated signal. T modulated signals from transmitters 134a through 134t are transmitted from antennas 136a through 136t, respectively.

At receiver station 150, R antennas 152a through 152r receive the T modulated signals from transmitter station 110, and each antenna 152 provides a received signal to a respective receiver (RCVR) 154. Each receiver 154 processes (e.g., filters, amplifies, downconverts, digitizes) its received signal and provides input samples to an associated OFDM demodulator (Demod) 156 and a noise estimator/processor 160. Each OFDM demodulator 156 performs OFDM demodulation on its input samples and provides received symbols to a receive (RX) spatial processor 170. Processor 160 estimates noise based on the input samples as described below and provides noise estimates to RX spatial processor 170. Processor 170 estimates the MIMO channel response based on received pilot symbols, performs detection on received data symbols with the channel estimates and the noise estimates, and provides data symbol estimates. An RX data processor 170 further processes (e.g., deinterleaves and decodes) the data symbol estimates and provides decoded data.

Controllers/processors 140 and 180 direct the operation at stations 110 and 150, respectively. Memories 142 and 182 store data and program codes for stations 110 and 150, respectively.

IEEE 802.11a/g utilizes a subcarrier structure that partitions the system bandwidth into K=64 subcarriers, which are assigned indices of −32 to +31. Of these 64 total subcarriers, 48 subcarriers with indices of $\pm\{1, \ldots, 6, 8, \ldots, 20,$ $22, \ldots, 26\}$ are used for data transmission and are referred to as data subcarriers. Four subcarriers with indices of $\pm\{7, 21\}$ are used for pilot and are referred to as pilot subcarriers. The DC subcarrier with index of 0· and the remaining subcarriers are not used. This subcarrier structure is described in IEEE Standard 802.11a entitled "Part 11: Wireless LAN Medium Access Control (MAC) and Physical Layer (PHY) Specifications: High-speed Physical Layer in the 5 GHz Band," September 1999, which is publicly available. IEEE 802.11n utilizes a subcarrier structure having 52 data subcarriers with indices of $\pm\{1, \ldots, 6, 8, \ldots, 20, 22, \ldots, 28\}$ and four pilot subcarriers with indices of $\pm\{7, 21\}$.

Figure 2:
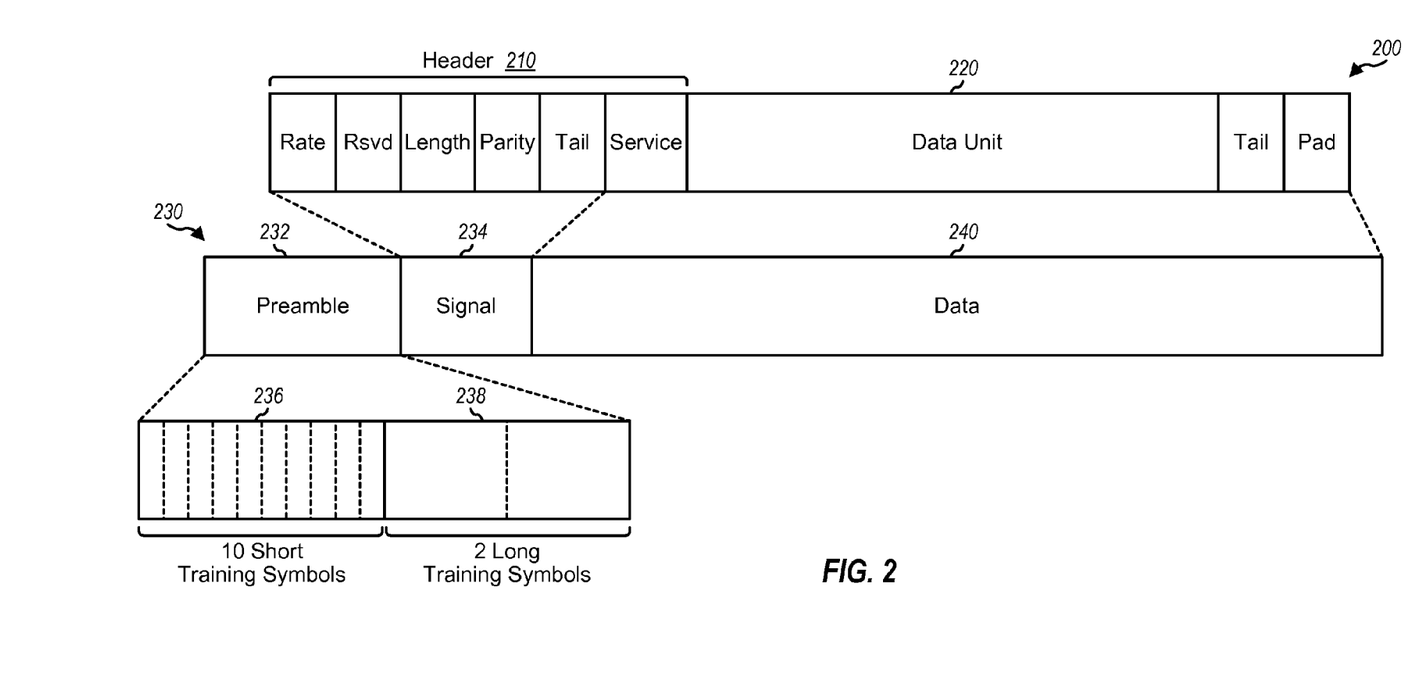
FIG. 2 shows a packet format in IEEE 802.11.

FIG. 2 shows a packet format 200 in IEEE 802.11. At a physical (PHY) layer in the protocol stack for IEEE 802.11, data is processed as PHY sublayer service data units (PSDUs). A PSDU 220 is encoded and modulated based on a coding and modulation scheme selected for that PSDU. PSDU 220 has a PLCP header 210 that includes six fields, which are shown in FIG. 2 and described in the IEEE 802.11a standard. PSDU 220 and its associated fields are transmitted in a PHY protocol data unit (PPDU) 230 that includes three sections. A preamble section 232 has a duration of four OFDM symbol periods and carries ten short training symbols 236 followed by two long training symbols 238. The training symbols may be used for AGC, timing acquisition, coarse and fine frequency acquisition, channel estimation, and other purposes by a receiver station. A signal section 234 carries one OFDM symbol for the first five fields of PLCP header 210. A data section 240 carries a variable number of OFDM symbols for the service field of PLCP header 210, PSDU 220, and the subsequent tail and pad fields. PPDU 230 may also be referred to as a packet, a frame, or some other terminology.

In an embodiment, a noise estimate is derived for each packet and used for detection of the packet. By deriving a noise estimate for each packet, a receiver station can better compensate for noise variations across the K subcarriers and the R receivers. Consequently, improved performance may be realized.

A noise estimate may be derived in various manners. In one embodiment, a noise estimate is derived based on an AGC value. The noise floor of a receiver is determined by thermal noise and the gain of the receiver. The thermal noise may be quantified by a noise figure. The gain of the receiver may be given by an AGC value used to adjust the gain of the receiver to achieve a desired/fixed signal level. Calibration may be performed (e.g., at the factory) to ascertain the noise at the receiver output for different AGC values. A look-up table of noise versus AGC value may be stored at a receiver station. Thereafter, the current AGC value for the receiver may be provided to the look-up table, which may provide a corresponding noise estimate for the receiver.

In another embodiment, a noise estimate is derived based on the two long training symbols sent in the preamble. Each long training symbol is generated by (1) mapping 52 specific pilot symbols to the 52 subcarriers usable for transmission, (2) mapping 12 zero symbols with signal value of zero to the remaining 12 subcarriers, and (3) performing a 64-point inverse FFT on the 52 pilot symbols and 12 zero symbols to obtain a sequence of 64 time-domain samples. Each long training symbol is thus a specific sample sequence. The two long training symbols are generated in the same manner and are identical.

For a SISO or MISO transmission, receiver station 150 obtains a single stream of input samples from a single receiver, e.g., receiver 154a in FIG. 1. Receiver station 150 may perform noise estimation based on the input samples for the two long training symbols, as described below.

In an embodiment, a phase offset between the two long training symbols may be derived as follows:

$$c_s = \sum_{n=1}^{L} p(n) \cdot q^*(n), \text{ and} \qquad \text{Eq (1)}$$

$$z_s = \frac{c_s}{|c_s|}, \qquad \text{Eq (2)}$$

where p(n) is an input sample for the first long training symbol, q(n) is an input sample for the second long training symbol, $c_s$, is a correlation result, $z_s$ is a phase offset between the first and second long training symbols, L is the length of the long training symbol, and "*" denotes a complex conjugate.

L is equal to 64 for the long training symbol in IEEE 802.11a/g but may be equal to other values for other sequences that may be used for noise estimation.

Equation (1) performs a correlation between the input samples for the first long training symbol and the input samples for the second long training symbol. Equation (2) normalizes the correlation result to obtain the phase offset. This phase offset is due to frequency error at receiver station 150. The frequency error may result from error between the clocks at the transmitter and receiver stations, which causes the downconversion frequency at receiver station 150 to be different from the upconversion frequency at transmitter station 110. The frequency error may also be due to Doppler effect and/or other factors. The phase offset is equal to the frequency error times the length of the long training symbol. The phase offset may also be referred to as phase error, phase difference, and so on.

In an embodiment, a noise variance may be derived as follows:

$$\tilde{p}(n) = p(n) \cdot z_s^*, \text{ and} \qquad \text{Eq (3)}$$

$$N_s = \frac{1}{2L} \cdot \sum_{n=1}^{L} |\tilde{p}(n) - q(n)|^2, \qquad \text{Eq (4)}$$

where $\tilde{p}(n)$ is a phase corrected sample for the first long training symbol, and $N_s$ is a per-sample noise variance.

In equation (3), the p(n) samples are multiplied with $z_s^*$ to remove the phase offset and obtain phase corrected samples $\tilde{p}(n)$. The phase offset may also be removed from the q(n) samples instead of the p(n) samples. In equation (4), the q(n) samples are subtracted sample-by-sample from the $\tilde{p}(n)$ samples. The difference for each sample is squared, and the squared differences for all L samples in the long training symbol are accumulated to obtain a total difference power. This total difference power is the power of the differences between the $\tilde{p}(n)$ and q(n) sequences. The total difference power is divided by 2L to obtain the per-sample noise variance $N_s$. The factor of 2L includes (1) a factor of L for the L samples being accumulated and (2) a factor of two for the doubling of the variance from the difference operation in equation (4). The noise variance may also be referred to as a noise floor estimate or some other terminology.

Receiver station 150 may have a non-flat frequency response across the K total subcarriers. This non-flat frequency response may be due to filters and/or other circuit blocks at receiver station 150. The frequency response may be determined (e.g., by performing factory calibration or field measurement) and stored in a look-up table. In an embodiment, a noise variance may be derived for each subcarrier as follows:

$$N_s(k) = N_s \cdot G(k), \qquad \text{Eq (5)}$$

where G(k) is a scale factor for subcarrier k, and $N_s(k)$ is a noise variance for subcarrier k.

Scale factors G(k) may be determined for subcarriers of interest (e.g., data subcarriers) and used to account for the frequency response of these subcarriers. The range of the scale factors is determined by the peak-to-peak variation in the frequency response. For example, if the peak-to-peak variation is ±6 dB, then the scale factors may be positive and have a peak value of 4. The scale factors may be set to 1.0 for all subcarriers, e.g., if receiver station 150 does not have any knowledge of the frequency response of the receiver.

The noise variance may also be derived in other manners. $N_s$, $N_s(k)$ and/or other noise variances may be provided as the noise estimate for the packet.

In an embodiment, receiver station 150 performs data detection (or equalization) based on a minimum mean-square error (MMSE) technique, as follows:

$$\hat{S}(k) = \frac{R(k) \cdot H(k)}{|H(k)|^2 + N_s(k)}, \qquad \text{Eq (6)}$$

where R(k) is a received data symbol for subcarrier k,

H(k) is a channel gain for subcarrier k, and $\hat{S}(k)$ is a data symbol estimate for subcarrier k.

Receiver station 150 may perform a 64-point FFT on 64 input samples for each OFDM symbol during the data portion of a packet to obtain 64 received symbols for 64 total subcarriers. Receiver station 150 may estimate the channel gains of the data subcarriers based on the long training symbols. For simplicity, the description herein assumes no channel estimation error. Receiver station 150 may then perform MMSE detection on the received data symbol R(k) for each data subcarrier with the channel gain H(k) and the noise variance $N_s(k)$ for that subcarrier, e.g., as shown in equation (6). Receiver station 150 may also use the same noise variance $N_s$ for all data subcarriers.

For a SIMO or MIMO transmission, receiver station 150 obtains R streams of input samples from R receivers 154a through 154r, one input sample stream from each receiver. Receiver station 150 may perform noise estimation based on the input samples for the two long training symbols, as described below.

In an embodiment, a phase offset between the two long training symbols may be derived as follows:

$$c_m = \sum_{i=1}^{R} \sum_{n=1}^{L} p_i(n) \cdot q_i^*(n), \text{ and} \qquad \text{Eq (7)}$$

$$z_m = \frac{c_m}{|c_m|}, \qquad \text{Eq (8)}$$

where $p_i(n)$ is an input sample from receiver i for the first long training symbol, $q_i(n)$ is an input sample from receiver i for the second long training symbol, $c_m$ is a correlation for all R receivers, and $z_m$ is a phase offset between the first and second long training symbols.

In an embodiment, a noise variance may be derived for each receiver as follows:

$$\tilde{p}_i(n) = p_i(n) \cdot z_m^*, \text{ and} \quad \text{Eq (9)}$$

$$N_i = \frac{1}{2L} \cdot \sum_{n=1}^{L} |\tilde{p}_i(n) - q_i(n)|^2, \quad \text{Eq (10)}$$

where $N_i$ is a per-sample noise variance for receiver i.

In an embodiment, a noise variance may be derived for each subcarrier of each receiver as follows:

$$N_i(k) = N_i \cdot G_i(k), \quad \text{Eq (11)}$$

where $G_i(k)$ is a scale factor for subcarrier k of receiver i, and $N_i(k)$ is a noise variance for subcarrier k of receiver i.

In another embodiment, a noise variance may be derived for all receivers as follows:

$$N_t = \frac{1}{R} \cdot \sum_{i=1}^{R} N_i, \quad \text{Eq (12)}$$

where $N_t$ is the average noise variance for all receivers. A noise variance may then be derived for each subcarrier of each receiver as shown in equation (11), albeit with $N_i$ replaced with $N_t$.

In yet another embodiment, a noise variance may be derived for each subcarrier of all receivers as follows:

$$N(k) = \frac{1}{R} \cdot \sum_{i=1}^{R} N_i(k), \quad \text{Eq (13)}$$

where N(k) is the per-subcarrier noise variance.

The noise variance may also be derived in other manners. $N_i$, $N_i(k)$, $N(k)$, $N_t$ and/or other noise variances may be provided as the noise estimate.

In the embodiments described above, a phase offset is determined and applied to the p(n) or $p_i(n)$ samples. Receiver station 150 may receive packets from different transmitter stations, which may have different clock frequencies. IEEE 802.11a/g specifies clock accuracy of ±20 parts per million (ppm), which corresponds to 230 KHz offset at 5.8 GHz. Receiver station 150 may estimate and remove the frequency error of each received packet to improve detection performance.

In the embodiments shown in equations (7) through (10), a single phase offset is determined for all R receivers and used to derive the noise variance for each receiver. In another embodiment, a phase offset is determined for each receiver and used to derive the noise variance for that receiver. This embodiment may be used, e.g., if a different oscillator is used for each receiver. In yet another embodiment, a phase offset is not computed and hence not applied to the input samples. This embodiment may be used, e.g., when receiving a sequence of packets from the same transmitter station.

Transmitter station 110 may perform transmitter spatial processing for each data subcarrier, as follows:

$$x(k) = V(k) \cdot s(k), \quad \text{Eq (14)}$$

where $\bar{s}(k)$ is a T×1 vector of data symbols for subcarrier k,

V(k) is a T×T transmit matrix for subcarrier k, and x(k) is a T×1 vector of output symbols for subcarrier k.

V(k) may be a beamforming matrix that sends each data symbol on an eigenmode of a MIMO channel, a spatial spreading matrix that sends each data symbol from all T transmit antennas, an identity matrix that maps each data symbol to one transmit antenna, or some other matrix. However, spatial spreading and beamforming need not be utilized and may be omitted from the system.

In an embodiment, receiver station 150 performs MIMO detection based on an MMSE technique. Receiver station 150 may derive a spatial filter matrix for each data subcarrier as follows:

$$M(k) = D(k) \cdot H_{eff}^H(k) \cdot [H_{eff}(k) \cdot H_{eff}^H(k) + N(k)]^{-1}, \quad \text{Eq (15)}$$

where H(k) is an R×T MIMO channel response matrix for subcarrier k, $H_{eff}(k) = H(k) \cdot V(k)$ is an effective channel response matrix for subcarrier k, N(k) is an R×R noise matrix for subcarrier k, $D(k) = [\text{diag } \{H_{eff}^H(k) \cdot [H_{eff}(k) \cdot H_{eff}^H(k) + N(k)]^{-1} \cdot H_{eff}(k)\}]^{-1}$, and M(k) is a T×R spatial filter matrix for subcarrier k.

D(k) is a diagonal matrix of scaling values used to obtain normalized estimates of the data symbols. Receiver station 150 may estimate H(k) or $H_{eff}(k)$ based on a MIMO pilot sent by transmitter station 110 from all T transmit antennas.

Receiver station 150 may obtain N(k) as follows:

$$\underline{N}(k) = \begin{bmatrix} N_1(k) & 0 & \cdots & 0) \\ 0 & N_2(k) & \cdots & 0 \\ \vdots & \vdots & \ddots & \vdots \\ 0 & 0 & \cdots & N_R(k) \end{bmatrix}, \quad \text{Eq (16)}$$

where the diagonal elements of N(k) may derived as described above. Receiver station 150 may also obtain the noise matrix as $N(k) = N(k) \cdot I$ or $N(k) = N_t \cdot I$, where I is the identity matrix.

Receiver station 150 may perform MIMO detection as follows:

$$\hat{s}(k) = M(k) \cdot r(k) = s(k) + (k), \quad \text{Eq (17)}$$

where r(k) is an R×1 vector of received data symbols for subcarrier k, $\hat{s}(k)$ is a T×1 vector of data symbol estimates for subcarrier k, and n(k) is a noise vector after the MIMO detection.

The noise estimate may also be used for other detection techniques such as zero-forcing (ZF), maximum likelihood sequence estimator (MLSE), maximum likelihood (ML) decoding, list sphere decoding (LSD), multi-user detection (MUD), and so on. The noise estimate may also be used for decoding, e.g., to compute log-likelihood ratios (LLRs) or other probability functions.

Figure 3:
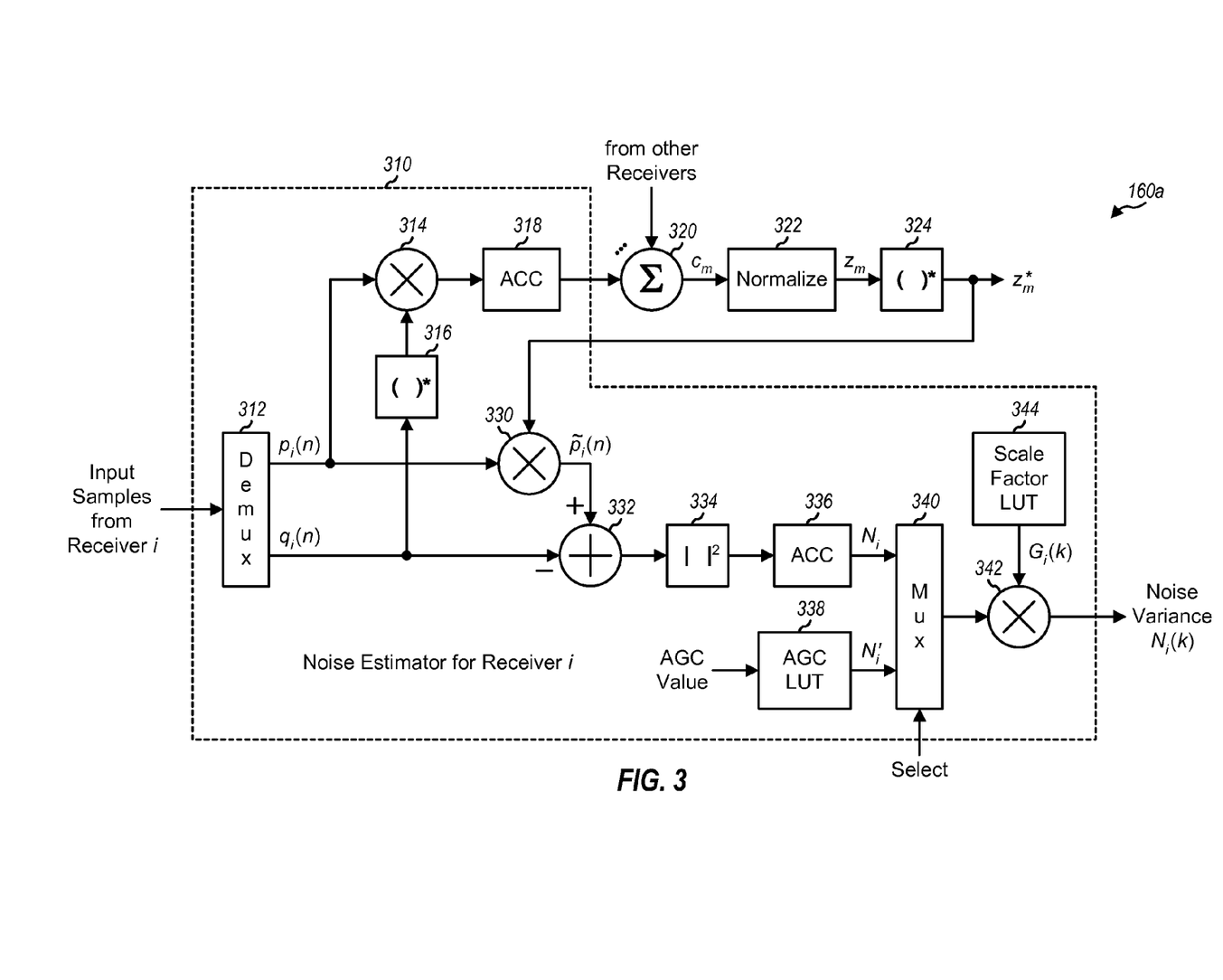
FIG. 3 shows an embodiment of a noise estimator/processor.

FIG. 3 shows a block diagram of a noise estimator/processor 160a, which is one embodiment of noise estimator/processor 160 in FIG. 1. Within a noise estimator 310 for receiver i, a demultiplexer (Demux) 312 receives input samples from receiver i, provides input samples p (n) for the first long training symbol to multipliers 314 and 330, and provides input samples $q_i(n)$ for the second long training symbol to a unit 316 and a summer 332. Unit 316 conjugates each input sample. Multiplier 314 multiplies each $p_i(n)$ sample with a corresponding $q_i^*(n)$ sample. An accumulator (ACC) 318 accumulates the output of multiplier 314 across the long training symbol and provides a correlation result for receiver i. A summer 320 sums the correlation results for all R receivers. A unit 322 normalizes the output of summer 320 and provides a phase offset $z_m$. A unit 324 conjugates the output of unit 322 and provides $z_m^*$.

Multiplier 330 multiplies each $p_i(n)$ sample with $z_m^*$ and provides a corresponding phase corrected sample, $\tilde{p}_i(n)$. Summer 332 subtracts each $q_i(n)$ sample from the corresponding $\tilde{p}_i(n)$ sample. A unit 334 computes the square magnitude of the output of summer 332. An accumulator 336 accumulates the output of unit 334 across the long training symbol and provides the noise variance $N_i$ for receiver i.

In an embodiment, noise estimation may be performed based on long training symbols (for a training-based method) or an AGC value (for an AGC-based method). The training-based method may be used, e.g., if the receiver is in an interference rich environment where an accurate noise estimate is beneficial. The AGC-based method may be used, e.g., if the receiver is well characterized, the AGC measurement is reasonably accurate, and a reduction in hardware is highly desirable. One noise estimation method may be selected based on a Select signal.

For the AGC-based method, a look-up table (LUT) 338 receives an AGC value for receiver i and provides a noise variance $N_i'$ for receiver i. The values stored in look-up table 338 may be generated with appropriate scaling so that the noise variance $N_i'$ generated with the AGC value is comparable to the noise variance $N_i$ generated based on the long training symbols. A multiplexer (Mux) 340 receives the noise variances $N_i$ and $N_i'$ and provides either $N_i$ or $N_i'$ based on the Select signal. A multiplier 342 multiplies the noise variance from multiplexer 340 with a scale factor $G_i(k)$ for each subcarrier k and provides the noise variance $N_i(k)$ for subcarrier k of receiver i. A look-up table 344 stores the scale factors for all subcarriers of interest (e.g., the data subcarriers) for receiver i. These scale factors account for the frequency response of receiver i and may be selected such that the noise variances have the proper level relative to the signal level at the MIMO detector input. The range of adjustment for these scale factors may be ±6 dB or less, and the scale factors may be positive with a peak value of 4.

For simplicity, FIG. 3 shows noise estimation for one receiver i. The noise estimation may be performed in similar manner for each remaining receiver. The summers and multipliers may each be implemented with a sufficient number of bits to achieve the desired accuracy. For example, 8-bit multipliers may be used to achieve 0.25 dB of accuracy. Fewer or more bits may also be used.

In the embodiment shown in FIG. 3, for both noise estimation methods, a noise variance is determined for each receiver and then multiplied with the scale factors to compensate for known variations across the subcarriers, e.g., as shown in equation (11). In another embodiment, a noise variance is determined for all receivers, e.g., as shown in equation (12), and then applied with the scale factors for each receiver, e.g., as shown in equation (11). The noise variances may also be determined in other manners.

Figure 4:
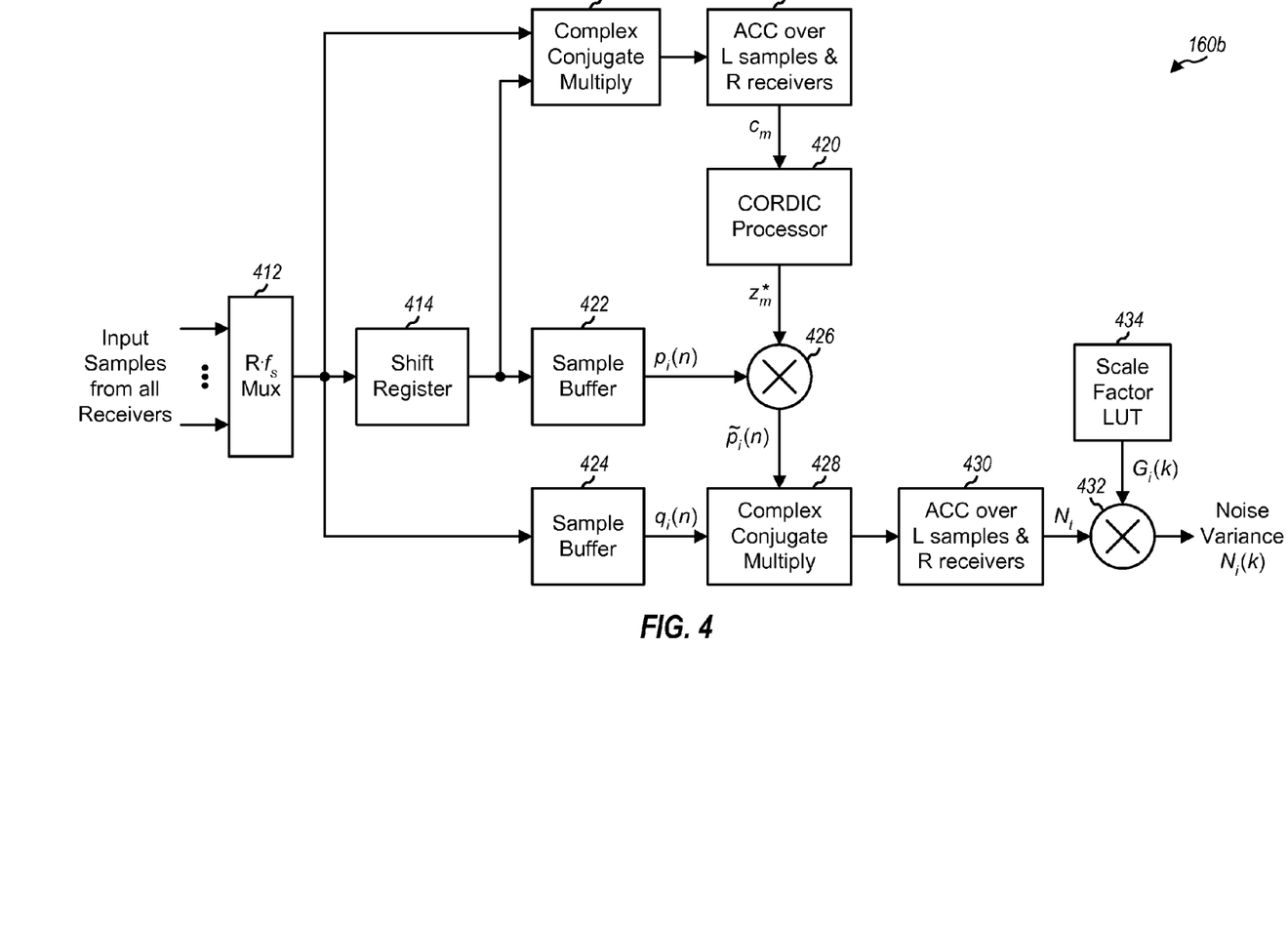
FIG. 4 shows another embodiment of a noise estimator/processor.

FIG. 4 shows a block diagram of a noise estimator/processor 160b, which is another embodiment of noise estimator/processor 160 in FIG. 1. Processor 160b performs noise estimation for all R receivers in a time division multiplex (TDM) manner using shared hardware. Each receiver 154 may provide input samples at a sample rate of $f_s$=20 MHz for IEEE 802.11a/g. The hardware within processor 160b may then operate at R·$f_s$, or 20·R MHz.

A multiplexer 412 receives input samples from all R receivers 154a through 154r. In each sample period, multiplexer 412 cycles through the R receivers and provides the input sample from each receiver to a shift register 414, a multiplier 416, and a sample buffer 424. In each sample period n, the input samples from all R receivers are TDM, e.g., $q_1(n), q_2(n), \ldots, q_R(n)$. Shift register 414 provides a sufficient amount of delay (e.g., 64 sample periods for one long training symbol in IEEE 802.11a/g) to time align the input samples for the first long training symbol with the input samples for the second long training symbol. A sample buffer 422 receives the output of register 414 and stores the $p_i(n)$ samples for the first long training symbol from all R receivers. Sample buffer 424 stores the $q_i(n)$ samples for the second long training symbol from all R receivers.

Multiplier 416 multiplies each sample from register 414 with a corresponding conjugated sample from multiplexer 412. An accumulator 418 sums the results across L samples and R receivers and provides a correlation result $c_m$. A Coordinate Rotational Digital Computer (CORDIC) processor 420 determines the phase of $c_m$ and provides phase offset $z_m^*$. A multiplier 426 multiplies the $p_i(n)$ samples from buffer 422 with $z_m^*$ and provides $\tilde{p}_i(n)$ samples. A unit 428 subtracts the $q_i(n)$ samples from the $\tilde{p}_i(n)$ samples and computes the squared magnitude of the differences. In the embodiment shown in FIG. 4, an accumulator 430 sums the output of unit 428 across all L samples and R receivers, e.g., as shown in equations (10) and (12), and provides the noise variance $N_t$. A multiplier 432 multiplies the noise variance $N_t$ with the scale factors for different subcarriers and receivers from a look-up table 434 and provides the noise variance $N_i(k)$ for each subcarrier of each receiver. In another embodiment, accumulator 430 sums the output of unit 428 across all L samples for each receiver, e.g., as shown in equation (10), and provides the noise variance N for each receiver. In yet another embodiment, multiplier 432 and look-up table 434 may be omitted.

Noise estimation may be performed as part of acquisition processing. In an embodiment, the phase offset $z_m$ is computed for each received packet during acquisition and used to ascertain the frequency error at receiver station 150. This frequency error is then applied, e.g., via a numerically controlled oscillator (NCO) operating on time-domain input samples in order to remove residual frequency offset between the clocks at transmitter station 110 and receiver station 150. The phase offset computed for acquisition may be reused for noise estimation. In this embodiment, the additional processing for noise estimation may include units 330 through 344 in FIG. 3 or units 422 through 434 in FIG. 4.

In the embodiments described above, a noise estimate is derived based on two identical sample sequences for two long training symbols sent with a packet. In general, a noise estimate may be derived based on any identical sample sequences or any sample sequences that are known by a receiver station. A noise estimate may also be derived based on more than two sample sequences. The differences between two consecutive sample sequences may be determined, and the differences for all pairs of consecutive sequences may be used to derive a noise estimate.

Figure 5:
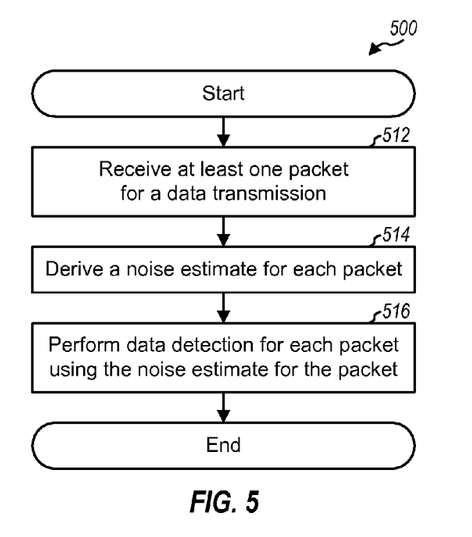
FIG. 5 shows a process for receiving packets.

FIG. 5 shows an embodiment of a process 500 for receiving packets. At least one packet is received for a data transmission (block 512). A noise estimate is derived for each packet, e.g., based on multiple identical sample sequences sent with the packet or an AGC value for the packet (block 514). Data detection is performed for each packet using the noise estimate for the packet (block 516). For block 516, at least one weight may be derived for each packet with the noise estimate for the packet, e.g., as shown in equation (6) or (15). Data detection may then be performed for each packet with the at least one weight for the packet.

Figure 6:
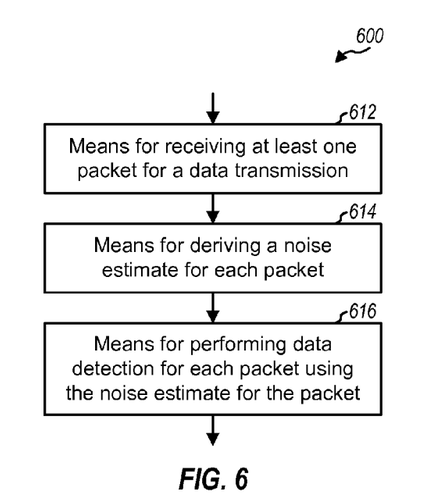
FIG. 6 shows an apparatus for receiving packets.

FIG. 6 shows an embodiment of an apparatus 600 for receiving packets. Apparatus 600 includes means for receiving at least one packet for a data transmission (block 612), means for deriving a noise estimate for each packet (block 614), and means for performing data detection for each packet using the noise estimate for the packet (block 616).

Figure 7:
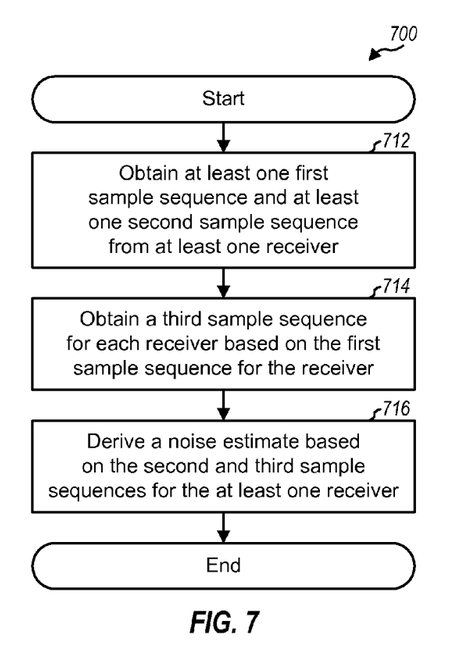
FIG. 7 shows a process for performing noise estimation.

FIG. 7 shows an embodiment of a process 700 for performing noise estimation at a receiver station. At least one first sample sequence (e.g., $p(n)$ or $p_i(n)$) and at least one second sample sequence (e.g., $q(n)$ or $q_i(n)$) is obtained from at least one receiver (block 712). A third sample sequence (e.g., $\tilde{p}(n)$ or $\tilde{p}_i(n)$) is obtained for each receiver based on the first sample sequence for the receiver (block 714). A noise estimate is derived based on the second and third sample sequences for the at least one receiver (block 716).

For block 714, a phase offset between the first and second sample sequences may be determined and applied to the first sample sequence for each receiver to obtain the third sample sequence for that receiver. The phase offset may be determined by correlating the first sample sequence with the second sample sequence for each receiver and accumulating the correlation result(s) for all receiver(s), e.g., as shown in equation (1) or (7). Alternatively, the first sample sequence for each receiver may be used as the third sample sequence for the receiver.

For block 716, the power of the differences between the second and third sample sequences for each receiver may be determined, and a noise variance may be derived for each receiver based on the power of the differences for that receiver, e.g., as shown in equation (10). Alternatively, the power of the differences for all receiver(s) may be summed to obtain the total difference power, a noise variance for all receiver(s) may be derived based on the total difference power, e.g., as shown in equation (12). In any case, the noise variance for each receiver may be scaled with multiple scaling factors for multiple subcarriers to obtain noise variances for the multiple subcarriers of the receiver, e.g., as shown in equation (5) or (11).

Figure 8:
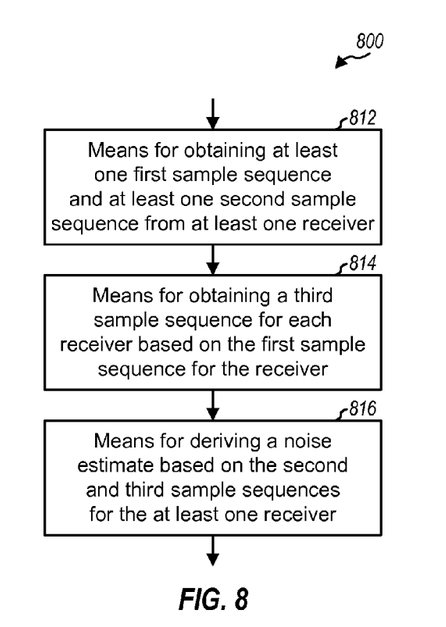
FIG. 8 shows an apparatus for performing noise estimation.

FIG. 8 shows an embodiment of an apparatus 800 for performing noise estimation. Apparatus 800 includes means for obtaining at least one first sample sequence and at least one second sample sequence from at least one receiver (block 812), means for obtaining a third sample sequence for each receiver based on the first sample sequence for the receiver (block 814), and means for deriving a noise estimate based on the second and third sample sequences for the at least one receiver (block 816).

The noise estimation techniques described herein may provide a relatively accurate noise estimate. The noise variances described above are unbiased and have the correct mean values. Computer simulation was performed for a wide range of signal-to-noise ratio (SNR) values. The standard deviation of the noise variances was found to be approximately 0.5 dB, which means that the noise variances are accurate to about 0.5 dB. Accuracy may be improved by deriving a noise variance per receiver and/or applying adjustments to compensate for known variations across subcarriers. An accurate noise estimate may allow for realization of improved detector weights, e.g., MMSE weights in equation (6) or (15). These improved detector weights may in turn improve data reception performance at receiver station 150, improve overall throughput by allowing for use for higher order modulation schemes at lower SNRs, and/or provide other benefits. The noise estimation described herein may be performed in a straightforward manner using little additional hardware/memory.

The noise estimation techniques described herein may be implemented by various means. For example, these techniques may be implemented in hardware, firmware, software, or a combination thereof. For a hardware implementation, the processing units used to perform noise estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the noise estimation techniques may be implemented with modules (e.g., procedures, functions, and so on) that perform the functions described herein. The firmware and/or software codes may be stored in a memory (e.g., memory 182 in FIG. 1) and executed by a processor (e.g., processor 180). The memory may be implemented within the processor or external to the processor.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The invention claimed is:
1. An apparatus comprising:
at least one processor configured to receive at least one packet for a data transmission, to derive a noise estimate for each of the at least one packet, and to perform data detection for each packet using the noise estimate for the packet, wherein deriving the noise estimate comprises:
    determining a phase offset between a first and second sample sequences, wherein the first and second sample sequences were substantially identical prior to determining the phase offset;
    applying the phase offset to the first sample sequence to obtain a third sample sequence; and
    deriving the noise estimate based on the second and third sample sequences; and
a memory coupled to the at least one processor.

2. The apparatus of claim 1, wherein the at least one processor is configured to derive at least one weight for each packet using the noise estimate for the packet and to performed data detection for each packet with at least one weight for the packet.

3. The apparatus of claim 2, wherein the at least one processor is configured to derive the at least one weight for each packet in accordance with a minimum mean-square error (MMSE) technique.

4. A method comprising:
receiving at least one packet for a data transmission;
deriving a noise estimate for each of the at least one packet, wherein deriving the noise estimate comprises:
    determining a phase offset between a first and second sample sequences, wherein the first and second sample sequences were substantially identical prior to determining the phase offset;
    applying the phase offset to the first sample sequence to obtain a third sample sequence; and
    deriving the noise estimate based on the second and third sample sequences; and
performing data detection for each packet using the noise estimate for the packet.

5. The method of claim 4, further comprising:
deriving at least one weight for each packet using the noise estimate for the packet; and
performing data detection for each packet with the at least one weight for the packet.

6. An apparatus comprising:
means for receiving at least one packet for a data transmission;
means for deriving a noise estimate for each of the at least one packet, wherein deriving the noise estimate comprises:
    determining a phase offset between a first and second sample sequence, wherein the first and second sample sequences were substantially identical prior to determining the phase offset;
    applying the phase offset to the first sample sequence to obtain a third sample sequence; and
    deriving the noise estimate based on the second and third sample sequences; and
means for performing data detection for each packet using the noise estimate for the packet.

7. The apparatus of claim 6, further comprising:
means for deriving at least one weight for each packet using the noise estimate for the packet; and
means for performing data detection for each packet with the at least one weight for the packet.

8. A non-transitory computer-readable medium including instructions stored thereon, comprising:
first instructions for directing reception of at least one packet for a data transmission;
second instructions for deriving a noise estimate for each of the at least one packet, wherein deriving the noise estimate comprises:
    determining a phase offset between a first and second sample sequence, wherein the first and second sample sequences were substantially identical prior to determining the phase offset;
    applying the phase offset to the first sample sequence to obtain a third sample sequence; and
    deriving the noise estimate based on the second and third sample sequences; and
third instructions for performing data detection for each packet using the noise estimate for the packet.

* * * * *